(12) United States Patent
Kenmochi

(10) Patent No.: US 8,711,476 B2
(45) Date of Patent: Apr. 29, 2014

(54) SCREEN

(75) Inventors: Nobuhiko Kenmochi, Suwa (JP); Noriko Kenmochi, legal representative, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/538,131

(22) Filed: Jun. 29, 2012

(65) Prior Publication Data

US 2013/0003175 A1    Jan. 3, 2013

(30) Foreign Application Priority Data

Jul. 1, 2011 (JP) .................................. 2011-147187

(51) Int. Cl.
*G03B 21/56* (2006.01)
*G03B 21/60* (2006.01)

(52) U.S. Cl.
USPC .......................................... 359/449; 359/452

(58) Field of Classification Search
USPC .................................. 359/449, 459, 452–453
See application file for complete search history.

(56) References Cited

U.S. PATENT DOCUMENTS

| 3,213,027 | A | * | 10/1965 | Fatuzzo et al. ................. 365/145 |
| 6,381,068 | B1 | | 4/2002 | Harada et al. |
| 7,719,762 | B2 | | 5/2010 | Kumasawa et al. |
| 2006/0014085 | A1 | * | 1/2006 | Nakajima et al. ................. 430/7 |
| 2007/0139766 | A1 | * | 6/2007 | Radcliffe et al. .............. 359/459 |
| 2011/0075258 | A1 | * | 3/2011 | Mullen ..................... 359/492.01 |
| 2011/0164317 | A1 | * | 7/2011 | Vergohl et al. ................ 359/460 |

FOREIGN PATENT DOCUMENTS

| JP | 08-327805 | 12/1996 | |
| JP | 2002-540445 | 11/2002 | |
| JP | 2006-227581 | 8/2006 | |
| JP | 2008129546 A | * 6/2008 | ............... G02B 5/02 |

* cited by examiner

*Primary Examiner* — Christopher Mahoney
(74) *Attorney, Agent, or Firm* — Workman Nydegger

(57) ABSTRACT

A screen includes a polarization layer having plural acicular particles provided with their major axes oriented nearly in the same direction on a substrate, and has polarization selectivity of reflecting light in one polarization direction and absorbing light in the other polarization direction of two polarization directions orthogonal to each other on a plane perpendicular to incident light.

6 Claims, 6 Drawing Sheets

SCREEN

The entire disclosure of Japanese Patent Application No. 2011-147187, filed Jul. 1, 2011 is expressly incorporated by reference herein.

BACKGROUND

1. Technical Field

The present invention relates to a screen.

2. Related Art

Patent Document 1 (JP-T-2002-540445) has disclosed a configuration of a reflective projection screen combined with a projector. Here, when a projection screen having a reflective polarization element is used with a projector that generates polarized light and the polarization state of the light from the projector is a polarization state reflected by the reflective polarization element, most of the light is reflected by the screen.

In Patent Document 1, as a specific configuration example of the reflective polarization element, a multilayer reflective polarizer, a continuous/discontinuous phase reflective polarizer, a cholesteric reflective polarizer (combined with a quarter-wave plate), and a wire grid polarizer have been cited. The structures and manufacturing processes of these polarizers are complicated and the larger the screen, the higher the cost.

SUMMARY

An advantage of some aspects of the invention is to provide a screen that may suppress cost by simplifying its structure and manufacturing process and improve contrast by reducing an influence by environment light.

An aspect of the invention is directed to a screen including a substrate, and a polarization layer having plural acicular particles provided with major axis directions oriented nearly in the same direction on the substrate, wherein light reflectance with respect to a first polarized light in a first polarization state is higher than light reflectance with respect to a second polarized light in a second polarization state different from the first polarization state.

According to the configuration, the light reflectance with respect to the light in the first polarization state is higher than the light reflectance with respect to the light in the second polarization state different from the first polarization state, and thus, when the screen is used in combination with the projector, the reflectance of environment light entering the screen may be significantly reduced and image contrast may be improved. Further, the configuration of the screen according to the aspect of the invention is simple and easily manufactured, and thus, the cost may be suppressed.

Each major axis of the plural acicular particles may be oriented along a surface of the substrate.

According to the configuration, of the incident light entering the screen, the linearly-polarized light having the polarization direction aligned with the minor axis directions of linear particles may be reflected and the linearly-polarized light having the polarization direction aligned with the major axis directions of the linear particles may be absorbed. Alternatively, of the incident light entering the screen, the linearly-polarized light having the polarization direction aligned with the minor axis directions of linear particles may be absorbed and the linearly-polarized light having the polarization direction aligned with the major axis directions of the linear particles may be reflected.

The polarization layer may transmit the first polarized light and may absorb the second polarized light. A polarization direction of the first polarized light aligns with a minor axis direction of one of the plurality of acicular particles, and a polarization direction of the second polarized light aligns with a major axis direction of the one of the plurality of acicular particles. Further, a light reflection surface may be provided at the substrate side of the polarization layer.

According to the configuration, the polarized light in the polarization direction aligned with the major axis directions of the plural acicular particles is absorbed by the acicular particles. On the other hand, the polarized light in the polarization direction aligned with the minor axis directions of the plural acicular particles is reflected by the reflection member toward an observer.

The polarization layer may transmit the second polarized light and may reflect the first polarized light. A polarization direction of the first polarized light aligns with a major axis direction of one of the plurality of acicular particles, and a polarization direction of the second polarized light aligns with a minor axis direction of the one of the plurality of acicular particles. Further, a light absorbing member may be provided at the substrate side of the polarization layer.

According to the configuration, the polarized light in the polarization direction aligned with the minor axis directions of the acicular particles is absorbed by the light absorbing member. On the other hand, the polarized light in the polarization direction aligned with the major axis directions of the acicular particles is reflected by the acicular particles toward the observer.

The acicular particles may be metal nanorods.

According to the configuration, by using the metal nanorods as the acicular particles, the polarization layer having desired polarization selectivity may be easily manufactured and the manufacturing cost may be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be explained with reference to the drawings. Note that, in the respective drawings used for the following explanation, the scales of the respective members will be appropriately changed for recognizable sizes of the respective members.

First Embodiment

Figure 1:
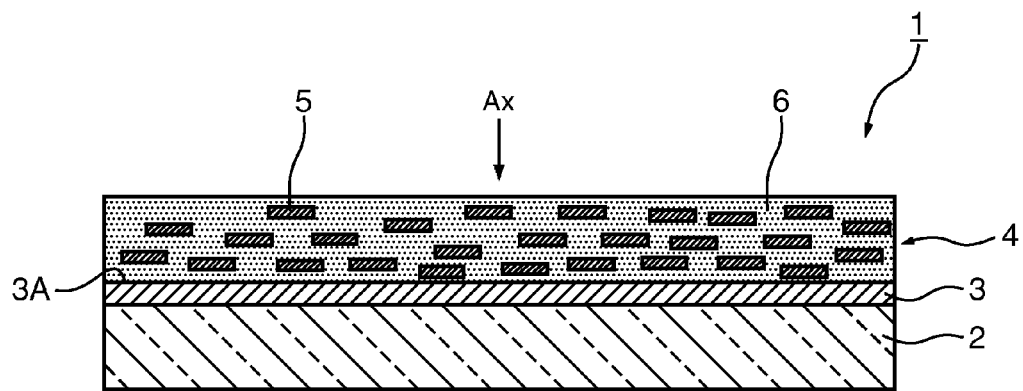
FIG. 1 is a sectional view showing a schematic configuration of a reflective screen as a first embodiment of the invention.

FIG. 1 is a sectional view showing a schematic configuration of a reflective screen as the first embodiment of the invention.

A reflective screen (hereinafter, simply referred to as "screen") 1 of the embodiment has a configuration in which a reflection film (reflecting member) 3 and a polarization layer 4 are stacked in this order on a flexible substrate (substrate) 2, and has a polarization selectivity of reflecting or absorbing light having a predetermined wavelength.

The specific material of the flexible substrate 2 is not particularly limited and any known resin may be used. Not particularly limited to the flexible substrate, but a glass substrate, a quartz substrate, a sapphire substrate, or the like may be used. In addition to the light-transmissive materials, opaque materials may be used.

In the polarization layer 4, plural nanorods (acicular particles) 5 are dispersed in a transparent layer 6 with their major axes aligned nearly in the same direction. Here, the nanorods 5 are oriented with the major axes along the surface of the flexible substrate 2.

The nanorod 5 is a nanosized rod-like metal fine particle having a predetermined aspect ratio (major axis length/minor axis length), and has dimensions of the average length of the major axis of about several tens of nanometers to several hundreds of nanometers and the average length of the minor axis of about several nanometers to several tens of nanometers. The nanorod 5 has different absorption properties with respect to a linearly-polarized light component having a vibration direction aligned with the minor axis of the nanorod 5 and with respect to a linearly-polarized light component having a vibration direction aligned with the major axis of the nanorod 5.

As the nanorod 5 of the embodiment, a metal nanorod as an anisotropic metal nanoparticle, a carbon nanotube, or the like may be cited. As the metal of the metal nanorod, Au, Ag, or the like may be cited. A metal with lower light reflectivity is selected because the rod is a fine particle, and its content is appropriately set.

Further, using the plural nanorods 5 with their major axes aligned nearly in the same direction, the polarization layer 4 having desired polarization selectivity is obtained. "Polarization selectivity" refers to a property of selectively absorbing linearly-polarized light having a specific plane of polarization and transmitting linearly-polarized light having the other specific plane of polarization with respect to incident light having two polarization directions orthogonal to each other on a plane perpendicular to the incident light.

As a material of the transparent layer 6, for example, a resin such as polyethylene or polypropylene, or an inorganic material consisting primarily of polysilazane, polysiloxane, polysilane, or the like may be used.

Figure 2:
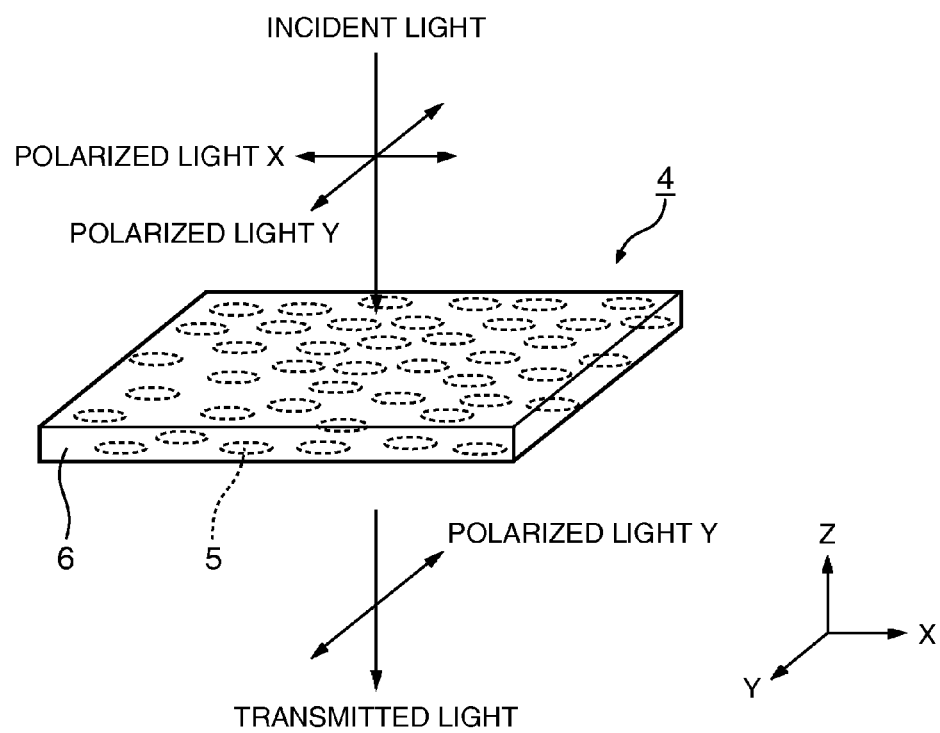
FIG. 2 is an explanatory diagram showing an action when light is transmitted and absorbed in a polarization layer.

FIG. 2 is an explanatory diagram showing an action when light is transmitted and absorbed in the polarization layer.

In the screen, as shown in FIG. 2, the plural nanorods 5 are oriented nearly in the same direction, and polarization selection is performed in response to the polarization state of the light entering the screen 1. Specifically, the nanorod 5 in the embodiment is an absorption nanorod, and absorbs the linearly-polarized light X having a polarization axis in a predetermined direction (X direction) in parallel to the major axis direction of the nanorod 5 and transmits linearly-polarized light Y having a polarization axis in a direction (Y direction) in parallel to the minor axis direction of the nanorod 5.

In the embodiment, the state in which the light is polarized in the direction in parallel to the minor axis directions of the nanorods 5 is a first polarization state, and the state in which the light is polarized in the direction in parallel to the major axis directions of the nanorods 5 is a second polarization state. Further, the linearly-polarized light Y in the first polarization state is a first polarized light and the linearly-polarized light X in the second polarization state is a second polarized light.

The reflection film 3 shown in FIG. 1 includes an Al film and reflects the first polarized light transmitted through the polarization layer 4 in a direction in parallel to an incident optical axis AX. Further, as the reflection film 3, not only the Al film but also an Ag film, a laminated film of Al and Ag, or the like may be used. The reflection film 3 is formed in a thickness that may secure flatness of the surface as a light reflection surface 3A.

Figure 3:
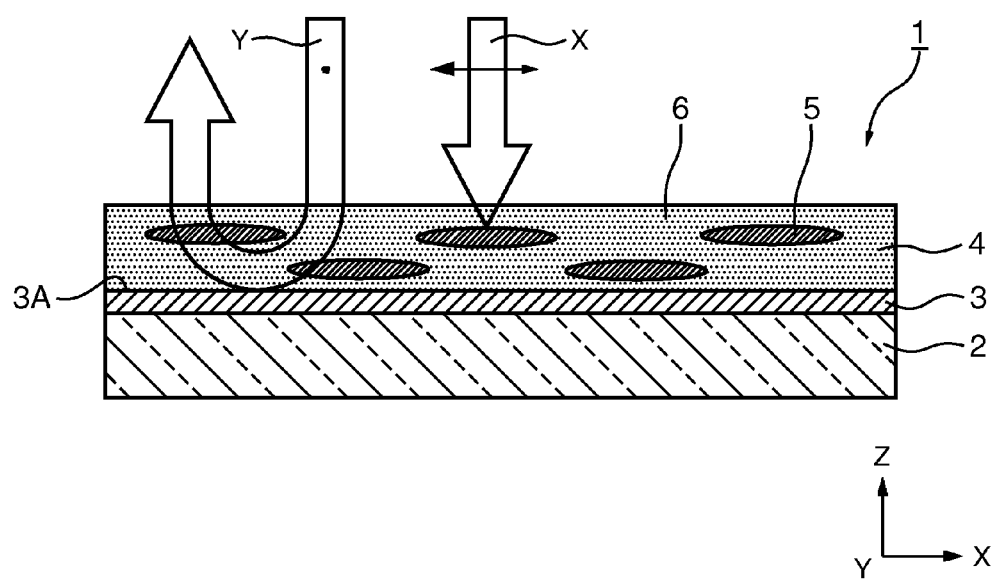
FIG. 3 is an explanatory diagram showing an action when light enters the screen.

FIG. 3 is an explanatory diagram showing an action when light enters the screen.

As described above, as shown in FIG. 3, of the light entering the screen 1, the linearly-polarized light Y transmitted through the polarization layer 4 is reflected in the reflection film 3 provided at the rear surface side (the flexible substrate 2 side) of the polarization layer 4. On the other hand, the linearly-polarized light X absorbed in the nanorods 5 within the polarization layer 4 is absorbed in the polarization layer 4, and does not enter the reflection film 3.

Therefore, the screen 1 has higher light reflectance with respect to the linearly-polarized light (first polarized light) Y in the first polarization state than the light reflectance with respect to the linearly-polarized light (second polarized light) X in the second polarization state.

Manufacturing Method

FIGS. 4A to 4D are process drawings showing a manufacturing method of the screen of the first embodiment.

Figure 4A:
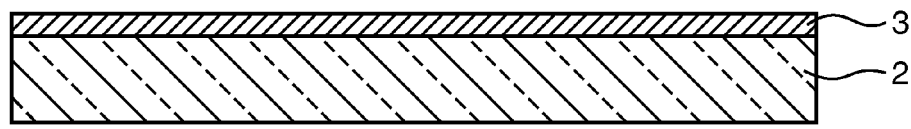
FIGS. 4A to 4D are process drawings showing a manufacturing method of the screen of the first embodiment.

First, as shown in FIG. 4A, the reflection film 3 is formed by evaporating a metal material (Al) on the surface of the flexible substrate 2 and performing heat hardening treatment thereon.

Figure 4B:
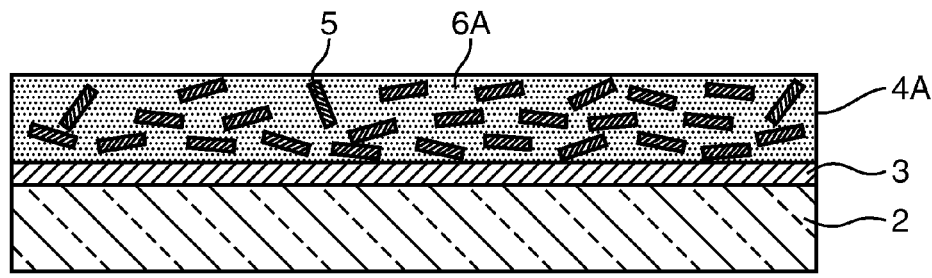

Then, as shown in FIG. 4B, a polarization layer formation material 4A containing plural nanorods 5 of Ag, Au, or the like in an organic solvent solution 6A is applied to the surface of the reflection film 3 (application step). The polarization layer formation material 4A is an organic solvent solution in which polysilazane as a raw material of silicon oxide is dissolved in an arbitrary organic solvent. As a technique for applying the polarization layer formation material 4A, a known printing technology or the like may be used.

At the stage of application of the polarization layer formation material 4A, the respective major axes of the plural nanorods 5 are randomly directed.

Figure 4C:
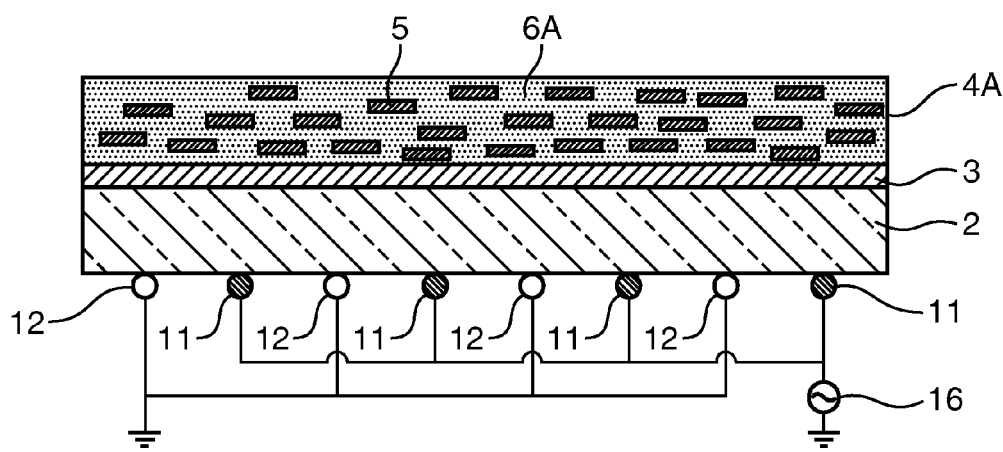

As shown in FIG. 4C, an electric field in a direction nearly in parallel to the principal surface of the flexible substrate 2 is applied to the polarization layer formation material 4A (electric field application step). In this regard, the flexible substrate 2 is mounted on a stage (not shown) on which first electrodes 11 and second electrodes 12 are alternately arranged.

The first electrodes 11 and the second electrodes 12 are alternately arranged at predetermined intervals in between. A high-frequency power supply 16 is connected to the first electrodes 11 and the second electrodes 12 are grounded. Under the condition, when a high-frequency voltage is applied between the first electrodes 11 and the second electrodes 12, electric fields are generated within the polarization layer formation material 4A in directions in parallel to the principal surface of the flexible substrate 2 in which the first electrodes 11 and the second electrodes 12 are opposed. All of the nanorods 5 have acicular shapes and polarization is generated in the nanorods 5. Accordingly, when a predetermined voltage is applied between the first electrodes 11 and the second electrodes 12, the nanorods 5 are oriented with their major axes along the lines of electric force (electric field direction) formed between the first electrodes 11 and the second electrodes 12. Thereby, the major axis directions of the nanorods 5 in the organic solvent solution 6A are oriented nearly in the same direction. The major axes of the respective nanorods 5 are nearly in parallel to the substrate surface.

Figure 4D:
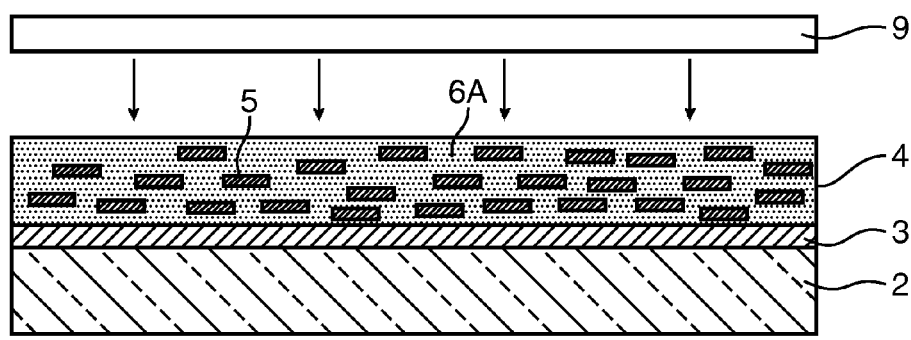

As shown in FIG. 4D, under the condition that the major axes of the nanorods 5 are aligned in the same direction, the organic solvent solution 6A is fired at predetermined heating temperature and heating time (firing step) using an oven 9 or the like, for example. Thereby, the organic solvent is removed, and polysilazane reacts with moisture and oxygen in the atmosphere, is solidified, and changes into silicon oxide. Concurrently, the nanorods 5 are oriented nearly in the same direction and fixed. In the above described manner, the polarization layer 4 of the embodiment as shown in FIG. 1 is formed.

In the screen 1 of the embodiment, using the polarization layer 4 in which the plural nanorods 5 with their major axes oriented nearly in the same direction are dispersed, of the incident light entering the screen 1, the linearly-polarized light Y along the minor axis directions of the nanorods 5 may be reflected to the incident side and the linearly-polarized light X along the major axis directions of the nanorods 5 may be absorbed.

Thereby, in the screen 1, of the incident light, the light reflectance with respect to the first polarized light (linearly-polarized light Y) is higher than the light reflectance with respect to the second polarized light (linearly-polarized light X). Accordingly, in the case where the screen 1 is used in combination with a projector, which will be described later, reduction in contrast ratio that may be caused due to environment light entering the screen 1 may be reduced.

Further, in the embodiment, the polarization layer formation material 4A may be applied to the surface of the reflection film 3 using a known printing technology or the like, and thus, a large-sized screen may be easily manufactured. Furthermore, a predetermined voltage is applied between the plural first electrodes 11 and the plural second electrodes 12 alternately arranged at the rear surface side of the flexible substrate 2, and thereby, the plural nanorods 5 in the transparent layer 6 may be oriented nearly in the same direction. A large-sized screen may be easily manufactured only by increasing the numbers of the first electrodes 11 and the second electrodes 12 in response to the size of the screen. In addition, the screen configuration is simple, and thus, the manufacturing cost may be significantly reduced.

Second Embodiment

Figure 5:
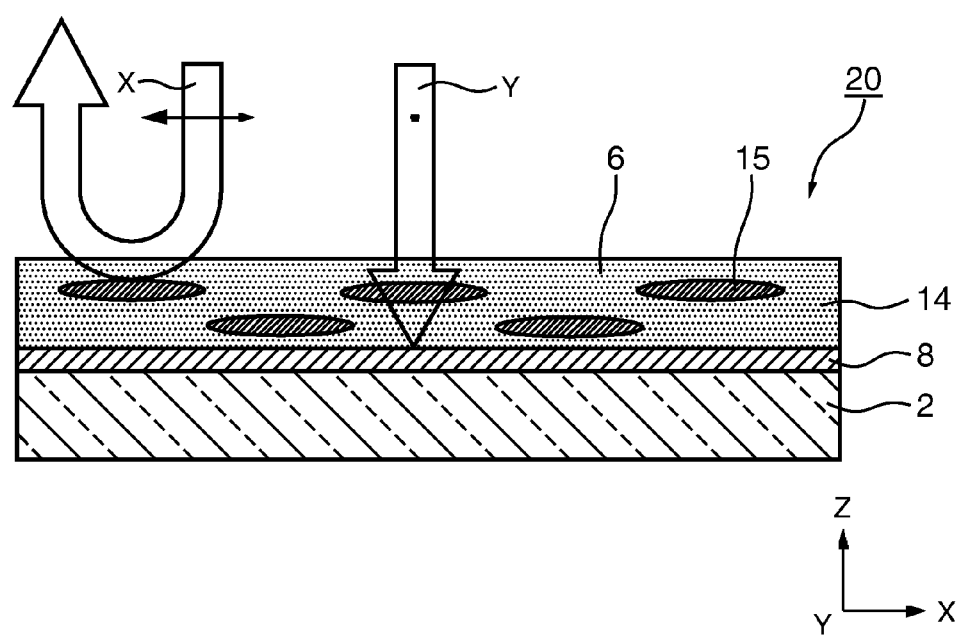
FIG. 5 is a sectional view showing a configuration of a reflective screen of a second embodiment.

FIG. 5 is a sectional view showing a configuration of a reflective screen of the second embodiment.

The basic configuration of the reflective screen of the embodiment as below is nearly the same as that of the first embodiment, but different in the configuration of the polarization layer. Accordingly, in the following explanation, the polarization layer will be explained in detail, and the explanation of the common parts will be omitted. Further, in the drawings used for explanation, the same signs will be assigned to the component elements in common with the above described embodiment.

As shown in FIG. 5, a reflective screen (hereinafter, simply referred to as "screen") 20 of the embodiment includes a polarization layer 14 in which plural reflective nanorods 15 with their major axes oriented nearly in the same direction and a light absorbing layer (light absorbing member) 8 provided at the rear surface (flexible substrate 2) side in the transparent layer 6.

In the reflective screen 20, the light absorbing layer 8 is provided between the flexible substrate 2 and the polarization layer 14. The light absorbing layer 8 absorbs a light component transmitted through the polarization layer 14 formed on its surface. As a material of the light absorbing layer 8, a vinyl chloride resin material is preferably used. For the light absorbing layer 8, a black material is not necessarily used. For example, light absorbability may be provided by painting the surface of the transparent resin layer black, for example. Further, the light absorbing layer 8 may be formed by antireflection treatment using AR (Anti Reflection) coating or the like on a predetermined resin layer or plate-like member.

The polarization layer 14 is formed on the surface of the light absorbing layer 8, and only the light component transmitted through the polarization layer 14 enters the light absorbing layer 8. Here, in the polarization layer 14 of the embodiment, the plural nanorods (acicular particles) 15 of Al are dispersed in the transparent layer 6. As the material of the nanorods 15, not only Al but also a metal having a sufficient light reflection property may be used.

As described above, by providing the light absorbing layer 8 between the polarization layer 14 and the flexible substrate 2, of the incident light entering the screen 20, the linearly-polarized light Y transmitted through the polarization layer 14 (the light along the minor axis directions of the nanorods 15) is absorbed in the light absorbing layer 8. Further, the linearly-polarized light X along the major axis directions of the nanorods 15 is reflected by the nanorods 15 to the incident side.

Note that, in the second embodiment, the state in which the light is polarized in the direction in parallel to the major axis directions of the nanorods 15 is a first polarization state, and the state in which the light is polarized in the direction in parallel to the minor axis directions of the nanorods 15 is a second polarization state. Further, the linearly-polarized light X in the first polarization state is a first polarized light and the linearly-polarized light Y in the second polarization state is a second polarized light.

Therefore, even with the polarization layer 14 using the nanorods 15 of Al, the same advantages as those of the first embodiment may be obtained. That is, in the screen 20, of the incident light, the light reflectance with respect to the first polarized light (linearly-polarized light X) is higher than the light reflectance with respect to the second polarized light (linearly-polarized light Y). In the case where the screen is used in combination with a projector, which will be described later, reduction in contrast ratio that may be caused due to environment light entering the screen 20 may be reduced.

Like the above described respective embodiments, the polarization components to be absorbed or reflected in the nanorods may be varied by changing the material of the nanorods. Thus, even when the nanorods having any property of having absorbability and reflectivity is used, the screen may be manufactured using the same manufacturing equipment and manufacturing method.

Projection Projector System

Figure 6:
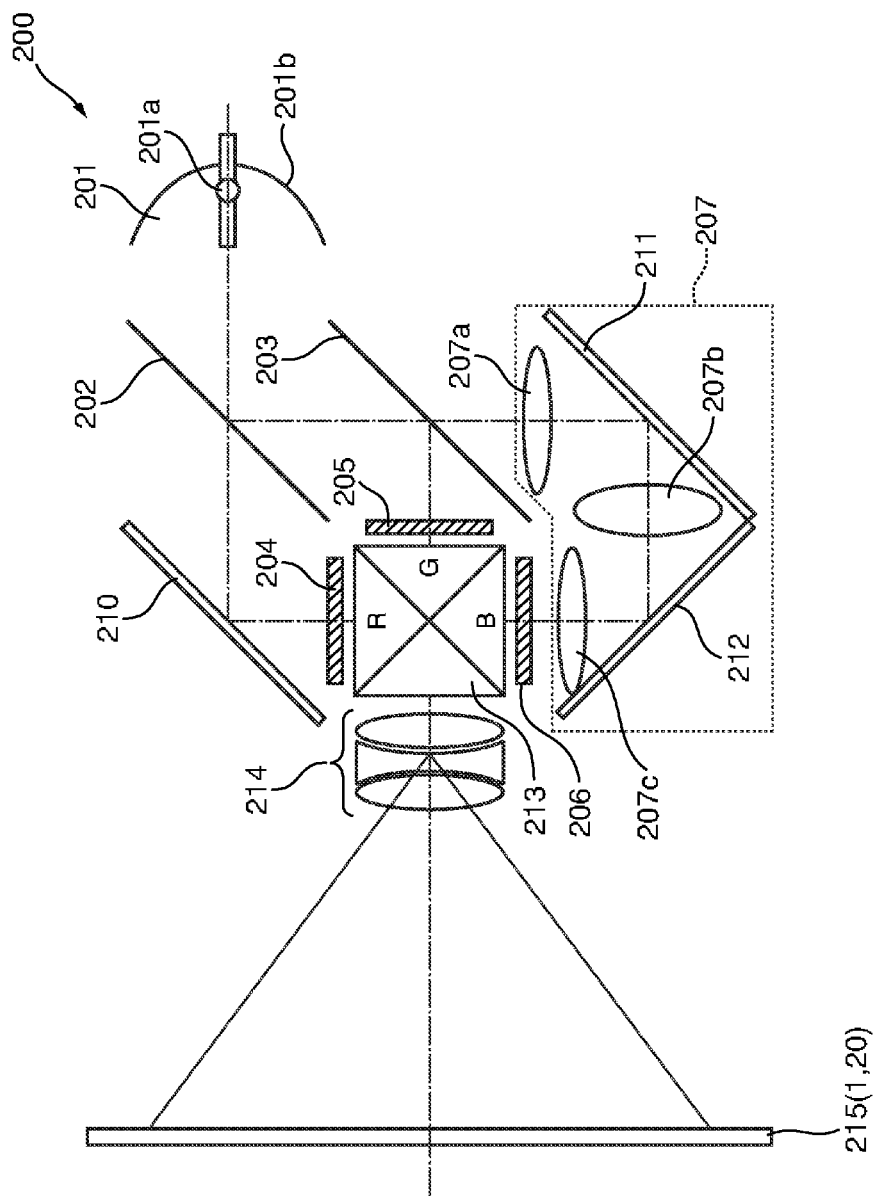
FIG. 6 shows a schematic configuration when the screen is used for a projection projector system.
Figure 7A:
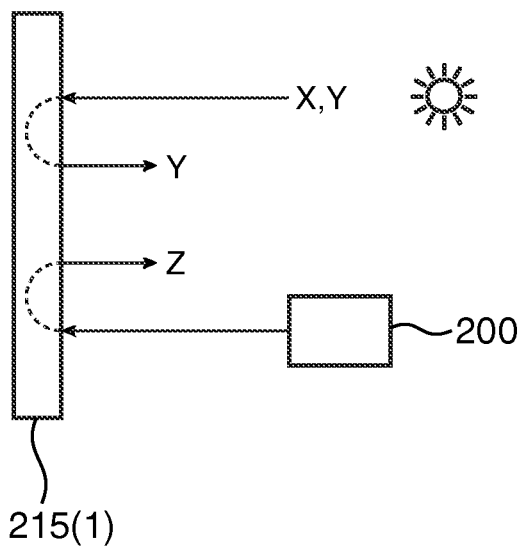
FIG. 7A shows an action when the reflective screen according to the first embodiment is used.
Figure 7B:
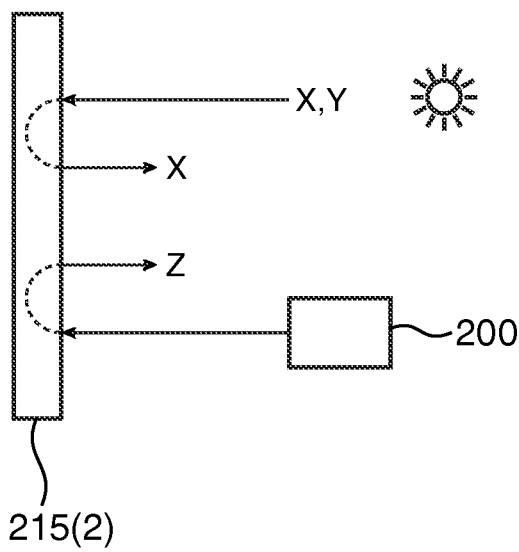
FIG. 7B shows an action when the reflective screen according to the second embodiment is used.

FIG. 6 shows a schematic configuration when the reflective screen according to the invention is used for a projection projector system. FIGS. 7A and 7B show actions of the screens of the respective embodiments when used for a projection projector system, and FIG. 7A shows an action of the screen of the first embodiment, and FIG. 7B shows an action of the screen of the second embodiment.

As shown in FIG. 6, a projection projector (projection display device) 200 includes a light source 201, dichroic mirrors 202, 203, a red light modulating unit 204, a green light modulating unit 205, and a blue light modulating unit 206 each including a liquid crystal device 100, a light guiding unit 207, reflection mirrors 210 to 212, a cross dichroic prism 213, and a projection lens 214. Image light Z output from the projection projector 200 is projected on a screen 215. As shown in FIGS. 7A and 7B, the image light Z output from the projection projector 200 is reflected on the screen 215 and enters an eye of a user in front (at the light incident side) of the screen 215. Therefore, for the screen 215, the above described reflective screens of the first embodiment and the second embodiment are used.

Here, the image light Z projected from the projection projector 200 toward the screen 215 has a polarization direction adjusted in advance, and is reflected on the screen 215. Specifically, when the screen 1 of the first embodiment is used as the screen 215, the image light is adjusted to be the linearly-polarized light Y along the minor axis directions of the nanorods 5 of the polarization layer 4 and, when the screen 20 of the second embodiment is used as the screen 215, the image light is adjusted to be the linearly-polarized light X along the major axis directions of the nanorods 15 of the polarization layer 14.

The light source 201 includes a lamp 201a such as a metal halide lamp and a reflector 201b that reflects light of the lamp 201a.

The dichroic mirror 202 transmits red light contained in white light from the light source 201 and reflects green light and blue light. Further, the dichroic mirror 203 transmits the blue light and reflects the green light of the green light and the blue light reflected by the dichroic mirror 202.

The red light transmitted through the dichroic mirror 202 enters the red light modulating unit 204, and the unit modulates the entering red light based on a predetermined image signal. Further, the green light reflected by the dichroic mirror 203 enters the green light modulating unit 205, and the unit modulates the entering green light based on a predetermined image signal. Furthermore, the blue light transmitted through the dichroic mirror 203 enters the blue light modulating unit 206, and the unit modulates the entering blue light based on a predetermined image signal.

The light guiding unit 207 includes an entrance lens 207a, a relay lens 207b, and an exit lens 207c, and is provided for preventing light loss because of the longer optical path of the blue light.

The reflection mirror 210 reflects the red light transmitted through the dichroic mirror 202 toward the red light modulating unit 204. Further, the reflection mirror 211 reflects the blue light transmitted through the dichroic mirror 203 and the entrance lens 207a toward the relay lens 207b. Furthermore, the reflection mirror 212 reflects the blue light output from the relay lens 207b toward the exit lens 207c.

The cross dichroic prism 213 is formed by bonding four right angle prisms and a dielectric multilayer film that reflects red light and a dielectric multilayer film that reflects blue light are formed in an X-shape on the interfaces. By the dielectric multilayer films, three color lights are combined and light representing a color image is formed.

The projection lens 214 enlarges the color image combined by the cross dichroic prism 213 and projects it on the screen 215.

In the projection projector 200 having the above described configuration, one reflective screen of the respective embodiments is provided as the screen 215. When the screen 215 has the polarization layer 4 (in the first embodiment), the second polarized light (linearly-polarized light X) of outside light is absorbed by the polarization layer 4 (FIG. 3) and, when the screen 215 has the polarization layer (in the second embodiment), the second polarized light (linearly-polarized light Y) of outside light is absorbed by the light absorbing layer 8 (FIG. 5). Accordingly, mixing of the outside light component as noise in the image light component may be reduced.

The image light Z projected from the projection projector 200 onto the screen 215 has the polarization direction adjusted in advance to be reflected by the screen 215, and thus, all image light components projected from the projection projector 200 toward the screen 215 are reflected to the user side. As the amount of outside light is smaller than the amount of image light Z from the projection projector in the light entering the eye of the user, contrast of the image may be made higher and a better image may be visually recognized.

The outside light is environment light such as fluorescent lamp light in the room or sun light outside the room, and does not have any specific polarization state. The screen 1 (20) of the respective embodiments used as the screen 215 may absorb about a half of the outside light by the polarization layer 4 (14) having the above described configuration, and thus, a better image in visual recognition may be projected than that in the reflective screen in related art. Thereby, the contrast of the image projected from the projection projector is improved by the screen 1 (20) of the respective embodiments. Therefore, the projection projector itself may have higher quality.

The preferable embodiments according to the invention have been explained with reference to the accompanying drawings, however, obviously, the invention is not limited to the examples. It is clear that a person who skilled in the art could arrive at various modified examples or altered examples within the scope of the technical idea described in the appended claims, and it would be understood that the examples naturally fall within the technical idea of the invention.

For example, in the embodiments, the nanorods that transmit polarized light polarized in the minor axis directions and reflects or absorbs the polarized light polarized in the major axis directions have been used, however, nanorods that transmit polarized light polarized in the major axis directions and reflects or absorbs the polarized light polarized in the minor axis directions may be used.

Further, in the embodiments, gold or silver has been used as the material of the nanorods, however, not limited to that. As the material of the nanorods, a composite of gold and silver or a semiconductor material may be used.

Furthermore, the function of the light absorbing layer 8 may be provided to the flexible substrate 2 and the light absorbing layer 8 may be omitted. In this case, for example, by forming the flexible substrate 2 using a formation material containing a black light absorbing member, a substrate having light absorbability may be obtained.

In addition, the light absorbing layer 8 may be provided at the opposite side to that of the polarization layer 4 of the flexible substrate 2, and the reflection film 3 may be provided at the opposite side to that of the polarization layer 4 of the flexible substrate 2.

What is claimed is:
1. A reflecting screen comprising:
a substrate; and
a polarization layer having plural acicular particles provided with major axis directions oriented nearly in the same direction on the substrate; and
a member between the substrate and the polarization layer, wherein light reflectance with respect to a first polarized light in a first polarization state is higher than light reflectance with respect to a second polarized light in a second polarization state different from the first polarization state, wherein the member is configured to reflect the first polarized light and the polarization layer is configured to absorb the second polarized light, and wherein the polarization layer is a first layer of the screen in a view of a user side.

2. The reflecting screen according to claim 1, wherein each major axis of the plural acicular particles is oriented along a surface of the substrate.

3. The reflecting screen according to claim 1, wherein the polarization layer transmits the first polarized light and absorbs the second polarized light, wherein a polarization direction of the first polarized light aligns with a minor axis direction of one of the plurality of acicular particles;

a polarization direction of the second polarized light aligns with a major axis direction of the one of the plurality of acicular particles, and the member comprises a light reflection surface that is provided at the substrate side of the polarization layer.

4. The reflecting screen according to claim 1, wherein the acicular particles are metal nanorods.

5. A reflecting screen comprising:

a substrate; and a polarization layer having plural acicular particles provided with major axis directions oriented nearly in the same direction on the substrate; and a member between the substrate and the polarization layer, wherein light reflectance with respect to a first polarized light in a first polarization state is higher than light reflectance with respect to a second polarized light in a second polarization state different from the first polarization state, and wherein the plural acicular particles are configured to reflect the first polarized light and the member is configured to absorb the second polarized light, wherein the polarization layer is a first layer of the screen in a view of a user side.

6. The reflecting screen according to claim 5, wherein the polarization layer transmits the second polarized light and reflects the first polarized light, wherein a polarization direction of the first polarized light aligns with a major axis direction of one of the plurality of acicular particles; and a polarization direction of the second polarized light aligns with a minor axis direction of the one of the plurality of acicular particles, and the member comprises a light absorbing member that is provided at the substrate side of the polarization layer.

* * * * *